(12) United States Patent
Isogawa et al.

(10) Patent No.: US 11,715,240 B2
(45) Date of Patent: Aug. 1, 2023

(54) VIDEO AND AUDIO PRESENTATION DEVICE, VIDEO AND AUDIO PRESENTATION METHOD, AND PROGRAM

(71) Applicant: NIPPON TELEGRAPH AND TELEPHONE CORPORATION, Tokyo (JP)

(72) Inventors: Mariko Isogawa, Tokyo (JP); Dan Mikami, Tokyo (JP); Kosuke Takahashi, Tokyo (JP); Yoshinori Kusachi, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 169 days.

(21) Appl. No.: 17/430,257

(22) PCT Filed: Feb. 3, 2020

(86) PCT No.: PCT/JP2020/003847
§ 371 (c)(1),
(2) Date: Aug. 11, 2021

(87) PCT Pub. No.: WO2020/166402
PCT Pub. Date: Aug. 20, 2020

(65) Prior Publication Data
US 2022/0138999 A1 May 5, 2022

(30) Foreign Application Priority Data

Feb. 15, 2019 (JP) .................................. 2019-025761

(51) Int. Cl.
*G06T 11/00* (2006.01)
*A63B 69/00* (2006.01)
(Continued)

(52) U.S. Cl.
CPC .......... *G06T 11/00* (2013.01); *A63B 69/0002* (2013.01); *A63B 71/0622* (2013.01);
(Continued)

(58) Field of Classification Search
CPC ................. G06T 11/00; A63B 69/0002; A63B 71/0622; A63B 2102/02; A63B 2102/18;
(Continued)

(56) References Cited

U.S. PATENT DOCUMENTS 11,262,838 B2 * 3/2022 Fujinawa ............... G06F 3/0481
11,611,705 B1 * 3/2023 Chen .................... H04N 23/611
(Continued)

OTHER PUBLICATIONS

Mikami et al. (2018) "Virtual Reality-based Image Training System and Its Application to Baseball", NTT Technical Journal, Nippon Telegraph and Telephone Corporation, vol. 30, No. 1, Jan. 2018, with translation generated by machine.
(Continued)

*Primary Examiner* — Yu Chen

(57) ABSTRACT

A video and audio presentation device configured to present video and audio for sports training with less delay in physical reaction is provided. The device includes: an offset determination unit configured to determine a time-series offset $t_{offset}$ obtained by correcting a time difference $t_{diff}$ on a basis of a correction coefficient α, the time difference $t_{diff}$ representing a time difference between $A_{real}$ and $A_{mix}$, or a time difference between $A_{VR}$ and $A_{mix}$, where a physical reaction $A_{real}$ represents time-series data of physical reaction to an incoming object in a real environment, a physical reaction $A_{VR}$ represents time-series data of physical reaction to an incoming object presented in a virtual reality environment, and a physical reaction $A_{mix}$ represents time-series data of physical reaction to an incoming object presented in a semi-virtual reality environment; a video presentation unit configured to present video in the semi-virtual reality envi-
(Continued)

ronment; and an audio presentation unit configured to shift audio corresponding to the video on a basis of the time-series offset $t_{offset}$ so that the audio precedes arrival of the video, and to present the shifted audio in the semi-virtual reality environment.

6 Claims, 5 Drawing Sheets

(51) Int. Cl.
*A63B 71/06* (2006.01)
*G06F 3/01* (2006.01)
*G06F 3/16* (2006.01)
*A63B 102/02* (2015.01)
*A63B 102/18* (2015.01)

(52) U.S. Cl.
CPC ............ *G06F 3/011* (2013.01); *G06F 3/165* (2013.01); *A63B 2069/0008* (2013.01); *A63B 2071/0625* (2013.01); *A63B 2071/0638* (2013.01); *A63B 2102/02* (2015.10); *A63B 2102/18* (2015.10); *A63B 2243/0025* (2013.01)

(58) Field of Classification Search
CPC .... A63B 2069/0008; A63B 2071/0625; A63B 2071/0638; A63B 2243/0025; G06F 3/011; G06F 3/165
See application file for complete search history.

(56) References Cited

U.S. PATENT DOCUMENTS

| | | | |
|---|---|---|---|
| 2018/0046431 A1* | 2/2018 | Thagadur Shivappa | G06F 3/16 |
| 2019/0215349 A1* | 7/2019 | Adams | G06F 3/017 |
| 2020/0322649 A1* | 10/2020 | Melkote Krishnaprasad | H04N 21/439 |
| 2021/0064122 A1* | 3/2021 | Fujinawa | G06T 19/006 |

OTHER PUBLICATIONS

Isogawa et al. (2018) "What can VR systems tell sports players? Reaction-based analysis of baseball batters in virtual and real worlds", IEEE VR.

\* cited by examiner

VIDEO AND AUDIO PRESENTATION DEVICE, VIDEO AND AUDIO PRESENTATION METHOD, AND PROGRAM

CROSS-REFERENCE TO RELATED APPLICATIONS

This application is a U.S. 371 Application of International Patent Application No. PCT/JP2020/003847, filed on 3 Feb. 2020, which application claims priority to and the benefit of JP Application No. 2019-025761, filed on 15 Feb. 2019, the disclosures of which are hereby incorporated herein by reference in their entireties.

TECHNICAL FIELD

The present invention relates to a video and audio presentation device, a video and audio presentation method, and a program.

BACKGROUND ART

There has been a system for performing sports training using Virtual Reality (VR) (e.g., Non-Patent Literature 1). In the present specification, the sports training is defined as training to improve subject's physical reaction to an object (incoming object) flying toward the subject. The physical reaction refers to any reaction of a body to the incoming object with a predetermined reaction time.

As in the system of Non-Patent Literature 1, it is known that a subject similarly reacts as in a real world when training in a virtual reality environment that faithfully reproduces the real world using VR technology (Non-Patent Literature 2).

CITATION LIST

Non-Patent Literature

Non-Patent Literature 1: Dan Mikami, Kosuke Takahashi, Naoki Saijo, Mariko Isogawa, Toshitaka Kimura, and Hideaki Kimata, "Virtual Reality-based Image Training System and Its Application to Baseball", NTT Technical Journal, Nippon Telegraph and Telephone Corporation, Vol. 30, No. 1, January 2018.
Non-Patent Literature 2: Isogawa, M., Mikami, D., Fukuda, T., Saijo N., Takahashi, K., Kimata, H., Kashino, M., "What can VR systems tell sports players? Reaction-based analysis of baseball batters in virtual and real worlds", IEEE VR, 2018.

SUMMARY OF THE INVENTION

Technical Problem

However, to experience a VR environment involves dedicated equipment such as a head-mounted display (HMD). Meanwhile, while a display other than the HMD (e.g., a flat display or a curved display) is considered to be easier to prepare equipment than the HMD, it is known that subject's physical reaction is delayed compared to a real environment and a VR environment when sports training is performed with a virtually displayed pitcher or an opponent, etc. on equipment such as a flat display.

This will be described with reference to FIG. 1. FIG. 1 is a graph illustrating results of an experiment (Non-Patent Literature 2) in which reaction time from release to swing start [sec] was examined for two types of pitches (fastball and curveball) when baseball batting practice is performed in the following cases: (1) real environment; (2) semi-virtual reality environment created by combining virtual reality environment and real environment (environment created by combining real environment and virtual reality environment presented on equipment such as a flat display, hereafter simply referred to as semi-virtual reality environment); (3) virtual reality environment including no real environment (complete VR environment involving a HMD, hereafter simply referred to as virtual reality environment).

As illustrated in FIG. 1, since subject's physical reaction in the virtual reality environment has similar tendency to one in the real environment, there is no significant delay. However, subject's physical reaction in the semi-virtual reality environment is delayed by up to about 0.2 sec compared to one in the real environment and in the virtual reality environment. This results from the subject having a difficulty in determination of the spatial position of an incoming object.

Accordingly, the present invention provides a video and audio presentation device configured to present video and audio for sports training with less delay in physical reaction.

Means for Solving the Problem

A video and audio presentation device according to the present invention includes an offset determination unit, a video presentation unit, and an audio presentation unit.

The offset determination unit is configured to determine a time-series offset $t_{offset}$ obtained by correcting a time difference $t_{diff}$ on a basis of a correction coefficient $\alpha$ determined according to a scale ratio of a real environment to a semi-virtual reality environment, or a scale ratio of a virtual reality environment to the semi-virtual reality environment, the time difference $t_{diff}$ representing a time difference between the physical reaction $A_{real}$ and the physical reaction $A_{mix}$, or a time difference between the physical reaction $A_{VR}$ and the physical reaction Ami, where a physical reaction $A_{real}$ represents time-series data of subject's physical reaction to an incoming object in the real environment, a physical reaction $A_{VR}$ represents time-series data of subject's physical reaction to an incoming object presented in the virtual reality environment that includes no real environment (hereinafter simply referred to as virtual reality environment), and a physical reaction $A_{mix}$ represents time-series data of subject's physical reaction to an incoming object presented in the semi-virtual reality environment created by combining the virtual reality environment and the real environment (hereinafter simply referred to as semi-virtual reality environment). The video presentation unit is configured to present video in the semi-virtual reality environment. The audio presentation unit is configured to shift audio corresponding to the video on a basis of the time-series offset $t_{offset}$ so that the audio precedes arrival of the video, and to present the shifted audio in the semi-virtual reality environment.

Effects of the Invention

The video and audio presentation device in the present invention presents video and audio for sports training with less delay in physical reaction.

DESCRIPTION OF EMBODIMENTS

Figure 1:
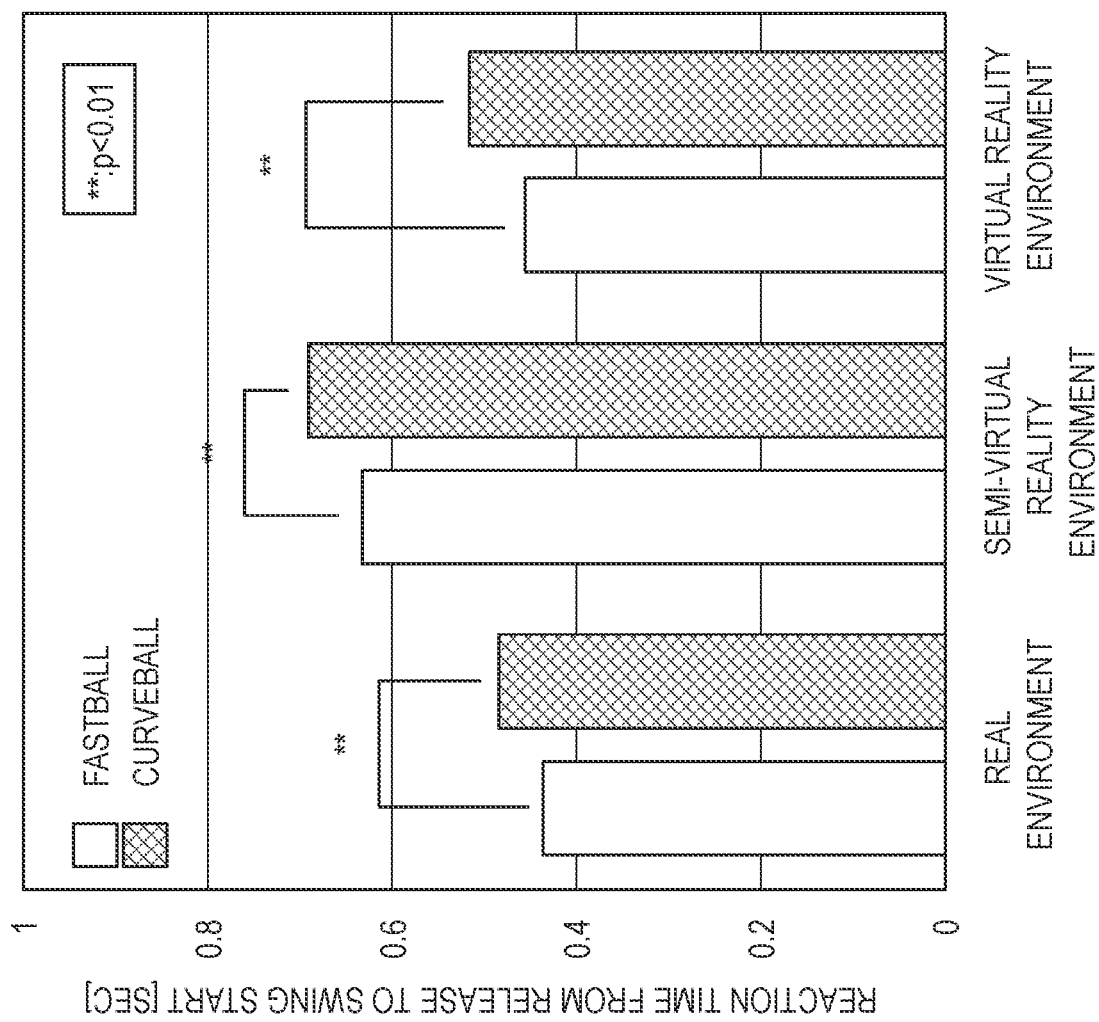
FIG. 1 is a graph illustrating results of an experiment in which time from release to swing start was examined for two types of pitches (fastball and curveball) when baseball batting practice is performed in the following cases: (1) real environment (2) semi-virtual reality environment and (3) virtual reality environment.

An embodiment of the present invention will be described in detail below with reference to the drawings. Components having the same functions are denoted by the same reference numerals, and redundant descriptions thereof will be omitted.

Embodiment 1

Figure 2:
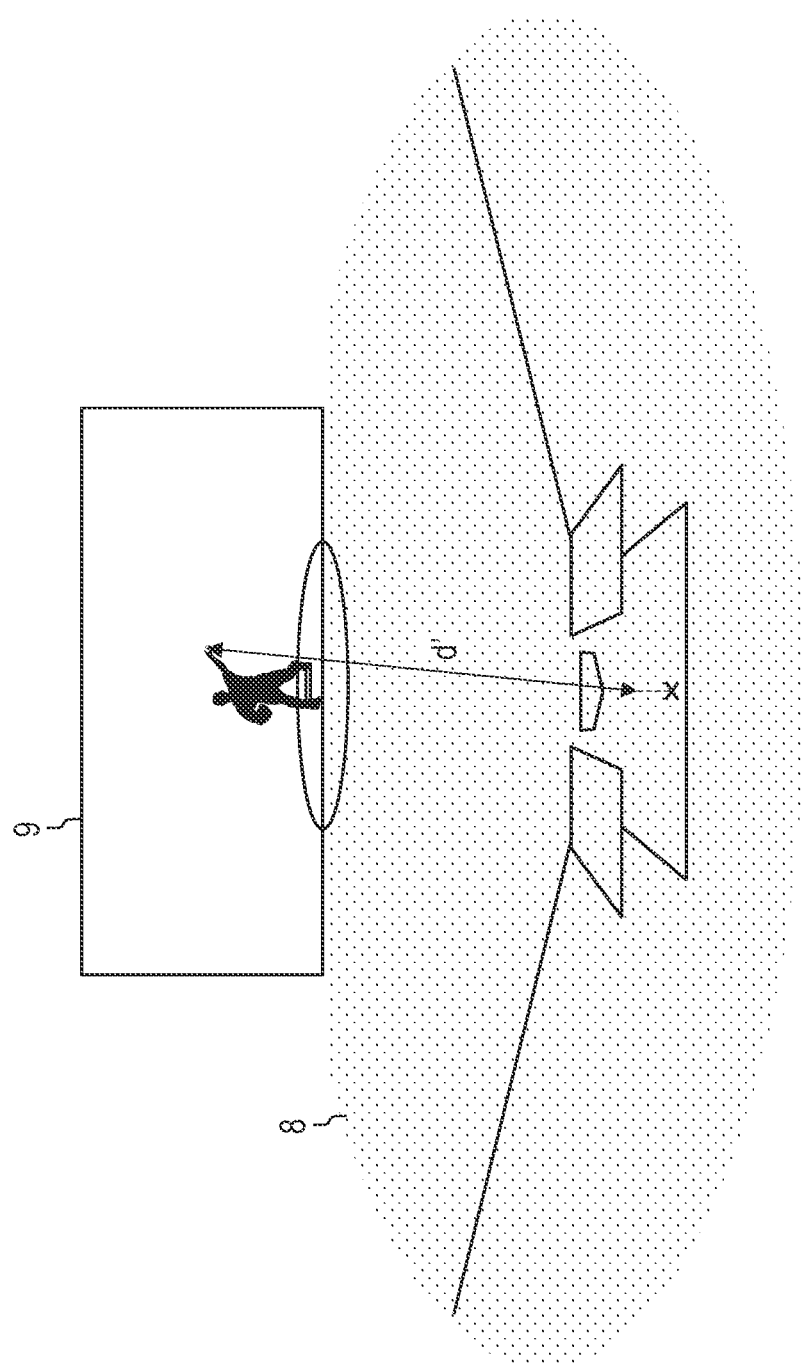
FIG. 2 is a diagram illustrating an example 1 of sports training presented in the semi-virtual reality environment of an embodiment 1.

An example of sports training presented in a semi-virtual reality environment created by a video and audio presentation device of the embodiment 1 will be described with reference to FIG. 2 and FIG. 3. For example, the video and audio presentation device according to the present embodiment creates a semi-virtual reality environment for baseball batting practice as shown in FIG. 2. Specifically, the video and audio presentation device displays a video of pitcher's pitching motion and an incoming ball on a flat display 9 in an environment including the large flat display 9 and a simulated field 8 reproducing an environment around a batter, such as a batter's box. Since an environment displayed on the flat display 9 is a virtual reality environment, the environment shown in the figure can be said to be the semi-virtual reality environment created by combining the virtual reality environment and a real environment.

Figure 3:
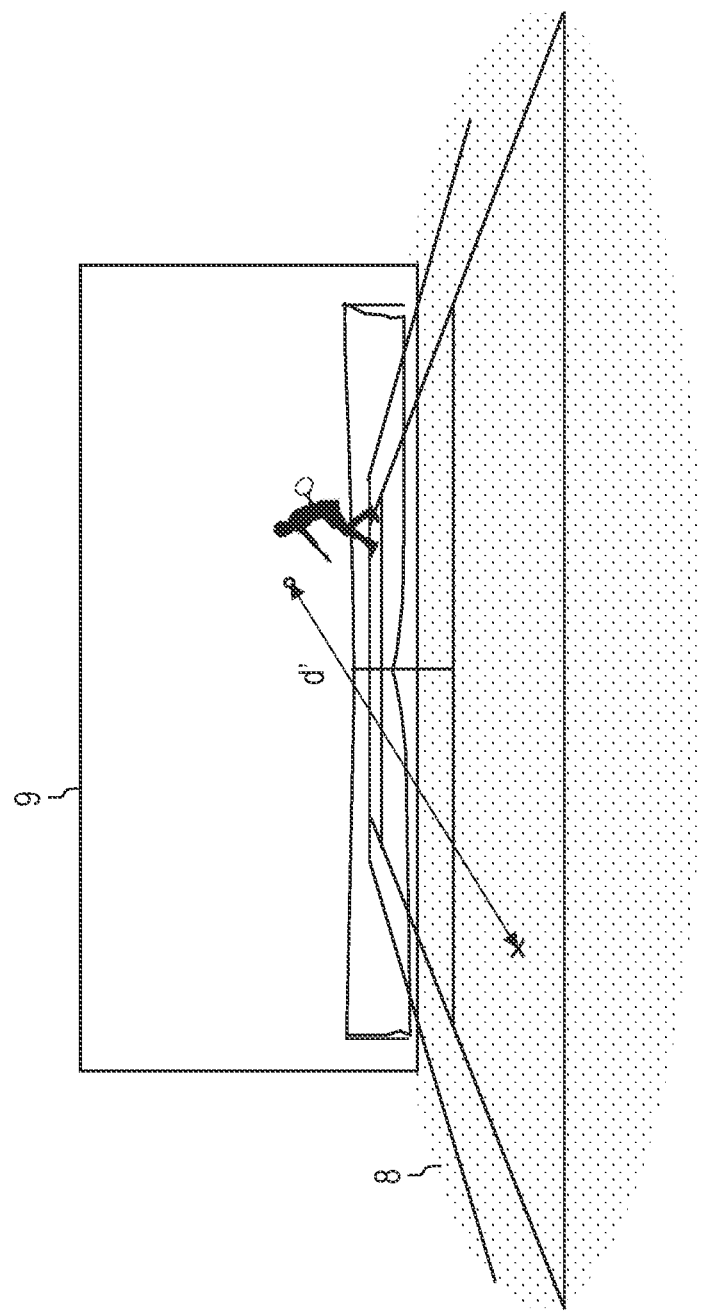
FIG. 3 is a diagram illustrating an example 2 of sports training presented in the semi-virtual reality environment of the embodiment 1.

Additionally, the video and audio presentation device according to the present embodiment creates a semi-virtual reality environment for tennis practice as shown in FIG. 3. Specifically, the video and audio presentation device displays a video of opponent's serving or returning motion and an incoming ball on a flat display 9 in an environment including the large flat display 9 and a simulated court 8 reproducing an environment around a player, such as one side of a tennis court. Since the environment displayed on the flat display 9 is a virtual reality environment, the environment shown in the figure can be said to be the semi-virtual reality environment created by combining the virtual reality environment and a real environment. Note that the video displayed on the flat display 9 is not limited to a video that reproduces the real environment, such as a video of the VR environment displayed in two dimensions, but may be a two-dimensional video made by capturing the real environment.

In FIG. 2 and FIG. 3, reference character d' represents a distance (initial distance) between the incoming object (ball) before release and a subject (or a catcher, or a reference position) in the semi-virtual reality environment in the figure. Note that d' is a concept that includes a virtual length. In the examples in the figures, d' is not a distance between the flat display 9 and the reference position but a sum of a distance between the flat display 9 and the reference position and a virtual distance in the virtual reality environment presented on the flat display 9.

Figure 4:
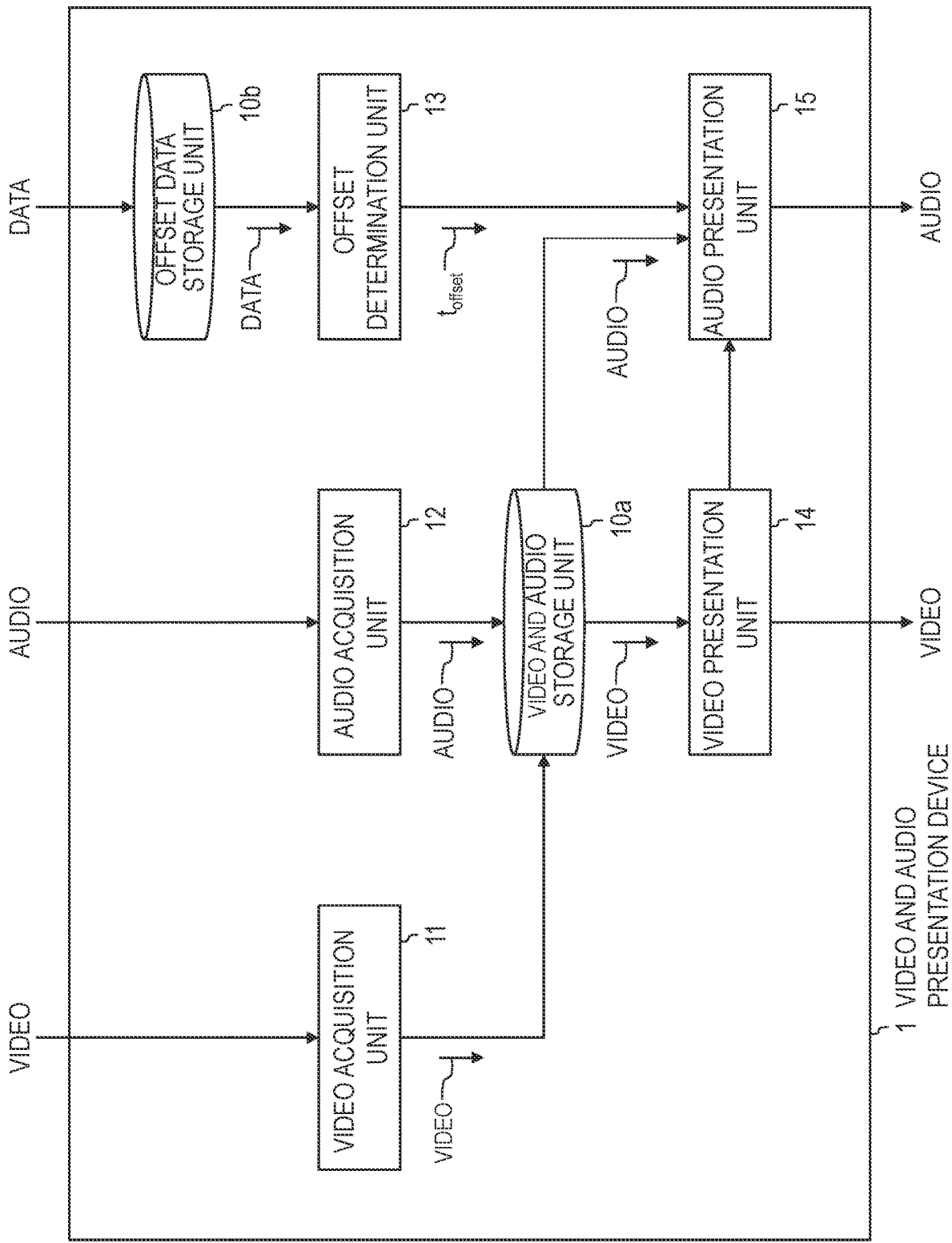
FIG. 4 is a block diagram illustrating an architecture of a video and audio presentation device of the embodiment 1.
Figure 5:
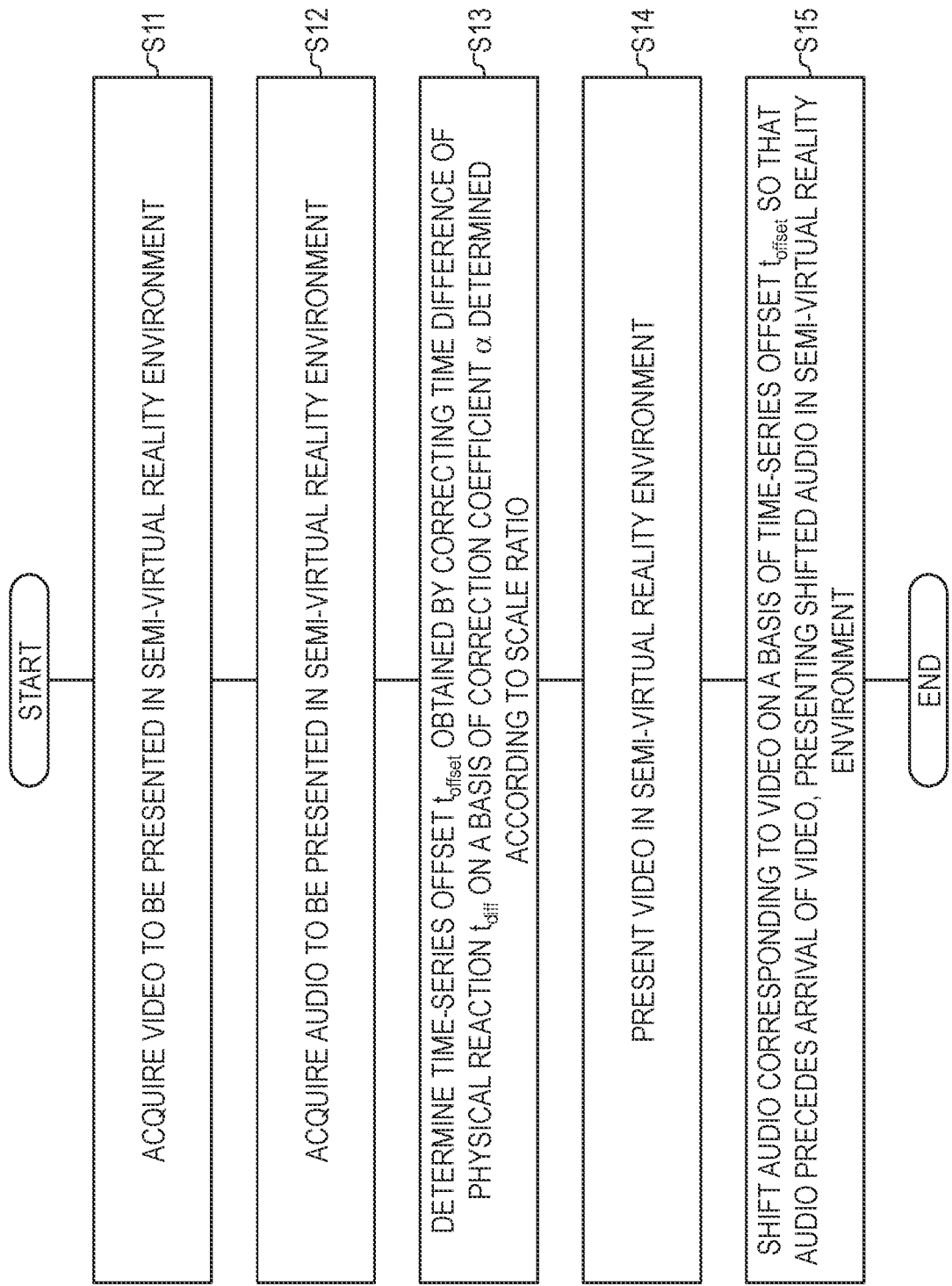
FIG. 5 is a flowchart illustrating operations of the video and audio presentation device of the embodiment 1.

An architecture of the video and audio presentation device according to the present embodiment will be described below with reference to FIG. 4. As shown in the figure, the video and audio presentation device 1 according to the present embodiment includes a video acquisition unit 11, a voice acquisition unit 12, a video and audio storage unit 10a, an offset data storage unit 10b, an offset determination unit 13, a video presentation unit 14, and an audio presentation unit 15. An operation of each component will be described below with reference to FIG. 5. In the following operations, baseball, tennis, and soccer will be described as examples, but the video and audio presentation device 1 according to the present embodiment is applicable to other sports training and is not limited to the above.

[Video Acquisition Unit 11]

The video acquisition unit 11 acquires video from an external device or the like to store the acquired video into the video and audio storage unit 10a (S11). The video corresponds to audio acquired in step S12, being presented in the virtual reality environment. Each frame of the video is associated with time information. The frame rate of the video is not particularly limited. The video relates to contents to be presented in the semi-virtual reality environment for performing sports training. For example, the contents include a video made by capturing a pitcher in baseball, an opponent player in tennis, a kicker in a free kick in soccer, or a video of these players created by computer graphics (CG). Note that "video" in the present specification does not include audio.

[Audio Acquisition Unit 12]

The audio acquisition unit 12 acquires, from the external device or the like, the audio produced by the incoming object to store the acquired audio into the video and audio storage unit 10a (S12). The audio corresponds to the video acquired in step S11, being presented in the virtual reality environment. The audio produced by the incoming object includes sound of a catcher catching a baseball, sound of hitting a tennis ball when serving or returning, sound of a tennis ball bouncing off a court, sound of kicking a soccer ball toward a goal, or sound of a soccer ball contacting with a goal net. The audio can be acquired by a camera with a general recording function or a recorder. Each frame of the audio is associated with time information, thus the audio corresponding to the video is uniquely determined frame-by-frame. The frame rate of the audio is not particularly limited.

[Video and Audio Storage Unit 10a]

The video and audio storage unit 10a receives the video acquired by the video acquisition unit 11 and the audio acquired by the audio acquisition unit 12 to store them.

[Offset Data Storage Unit 10b]

The offset data storage unit 10b receives a time-series offset $t_{offset}$, or experimental parameters and a set of time-series offsets $t_{offset\text{-}baseball}$, $t_{offset\text{-}tennis}$, $t_{offset\text{-}soccer}$, etc. or $t_{diff}$ and [r, d, r', d'] (or var), or $t_{diff}$ to store the received data, outputting the received data to the offset determination unit 13.

The time difference $t_{diff}$ is defined as follows. A physical reaction $A_{real}$ represents time-series data of subject's physical reaction to an incoming object in the real environment. A physical reaction $A_{VR}$ represents time-series data of subject's physical reaction to an incoming object created in the virtual reality environment that does not include the real environment (hereinafter simply virtual reality environment). A physical reaction $A_{mix}$ represents time-series data of subject's physical reaction to an incoming object created in the semi-virtual reality environment created by combining the virtual reality environment and the real environment (hereinafter simply semi-virtual reality environment). The time difference $t_{diff}$ is defined as a time difference between the physical reaction $A_{real}$ and the physical reaction $A_{mix}$, or a time difference between the physical reaction $A_{VR}$ and the physical reaction $A_{mix}$.

Scale information includes that of the real environment and the semi-virtual reality environment, or that of the virtual reality environment and the semi-virtual reality environment. For example, reference character r represents a size (the largest value among a width, a depth, and a height) of an incoming object in the real environment (or the virtual reality environment). Reference character r' represents a size (the largest value among a width, a depth, and a height) of an incoming object in the semi-virtual reality environment. Reference character d represents a distance (initial distance) between the incoming object before release and the subject (or the reference position) in the real environment (or the virtual reality environment). Reference character d' represents a distance (initial distance) between the incoming object before release and the subject (or the reference position) in the semi-virtual reality environment. The scale information may include r, r', d, d', r'/r, and d'/d. The scale information may be a scalar value and stored in a vector. Hereafter the vector is referred to as var. For example, when a baseball (an incoming object) with a radius of 5 cm is pitched from a position 18 m away in a typical ballpark in a real environment, and when a baseball (an incoming object) with a radius of 4 cm is pitched from a position 16 m away in a ballpark in a semi-virtual reality environment, var=[r, r', d, d', r'/r, d'/d]=[5, 4, 18, 16, 4/5, 8/9] is given.

The offset data storage unit 10b may previously acquire, store, and output the time-series offset $t_{offset}$ obtained by correcting the time difference $t_{diff}$ on a basis of correction coefficient α. Specific examples of a method of deriving the correction coefficient α and that of calculating the time-series offset $t_{offset}$ are described below.

Let the correction coefficient α=(r'/r)*(d'/d). Then
$t_{offset}=t_{diff}*(r'/r)*(d'/d)$  [Calculation example 1]

Let the correction coefficient α=(r'/r). Then
$t_{offset}=t_{diff}*(r'/r)$  [Calculation example 2]

Let the correction coefficient α=(d'/d). Then
$t_{offset}=t_{diff}*(d'/d)$  [Calculation example 3]

The offset data storage unit 10b may acquire, store, and output, for example, the time-series offset $t_{offset-baseball}$ corresponding to baseball practice, the time-series offset $t_{offset-tennis}$ corresponding to tennis practice, the time-series offset $t_{offset-soccer}$ corresponding to soccer practice together with the experimental parameters that specify types of sports.

[Offset Determination Unit 13]

The offset determination unit 13 receives the time-series offset $t_{offset}$, or the experimental parameters, the time-series offsets $t_{offset-baseball}$, $t_{offset-tennis}$, $t_{offset-soccer}$, etc., or $t_{diff}$ and [r, d, r', d'] (or var), determines the time-series offset $t_{offset}$ obtained by correcting the time difference $t_{diff}$ on a basis of the correction coefficient α that depends on a scale ratio of the real environment (or the virtual reality environment) to the semi-virtual reality environment, and outputs the corrected time-series offset $t_{offset}$ to the audio presentation unit 15 (S13).

[Operation Pattern 1]

As described above, the time-series offset $t_{offset}$ may be previously stored in the offset data storage unit 10b, and the offset determination unit 13 may only acquire the stored time-series offset $t_{offset}$ from the offset data storage unit 10b.

[Operation Pattern 2]

The offset determination unit 13 may receive, as variables, parameters indicating a difference in experimental conditions (the experimental parameters) such as baseball, tennis and soccer, acquiring a time-series offset corresponding to the parameter (for example, any of $t_{offset-baseball}$, $t_{offset-tennis}$, $t_{offset-soccer}$, etc.) from the offset data storage unit 10b.

[Operation Pattern 3]

Furthermore, after only $t_{diff}$, r, and d are previously stored in the offset data storage unit 10b, the offset determination unit 13 may acquire r' and d' from the outside and $t_{diff}$, r, and d from the offset data storage unit 10b, and acquire a time-series offset $t_{offset}$ by calculating the time-series offset $t_{offset}$ using any of the calculation methods of the above calculation examples 1 to 3.

Alternatively, after only $t_{diff}$ is previously stored in the offset data storage unit 10b, the offset determination unit 13 may acquire r, d, r', and d' (or var=[r, r', d, d', r'/r, d'/d]) from the outside, acquire only $t_{diff}$ from the offset data storage unit 10b, and acquire the time-series offset $t_{offset}$ by calculating the time-series offset $t_{offset}$ using any of the calculation methods of the above calculation examples 1 to 3.

[Video Presentation Unit 14]

The video presentation unit 14 reads the video from the video and audio storage unit 10a to present the read video in the semi-virtual reality environment (S14).

[Audio Presentation Unit 15]

The audio presentation unit 15 receives the audio corresponding to the video to shift the received audio on a basis of the time-series offset $t_{offset}$ so that the audio precedes arrival of the video of the corresponding frame, presenting the shifted audio in the semi-virtual reality environment (S15).

The video and audio presentation device 1 according to the present embodiment shifts the audio corresponding to the video on a basis of the time-series offset $t_{offset}$ so that the audio precedes arrival of the video of the corresponding frame, thereby enabling presentation of the video and audio for sports training with less delay in physical reaction.

[Supplement]

The device according to the present invention includes, for example as a single hardware entity, an input unit connectable with a keyboard or the like, an output unit connectable with a liquid crystal display or the like, a communication unit connectable with a communication device (e.g. a communication cable) communicable with the outside of the hardware entity, a central processing unit (CPU, which may include cache memory, registers, etc.), random access memory (RAM) and read only memory (ROM) as memory, an external storage device including a hard disk, and a bus connected with the input unit, the output unit, the communication unit, the CPU, the RAM, the ROM, and the external storage device so that data can be exchanged between them. The hardware entity may also include, for example, a device (drive) capable of reading from and writing to a storage medium such as a CD-ROM as necessary. A physical entity having such hardware resources may be a general-purpose computer, for example.

The external storage device of the hardware entity previously stores programs necessary for performing the above-mentioned functions and data necessary for processing of the programs, for example (not limited to the external storage device, the programs may be prestored in, for example, the ROM, which is a read-only storage device).

Furthermore, data and other outcome resulting from the processing of the programs is appropriately stored in the RAM, the external storage device, or the like.

In the hardware entity, the programs and data necessary for the processing of the programs stored in the external storage device (or ROM, etc.) are read into the memory as necessary to be appropriately interpreted, executed, and processed by the CPU. Consequently, the CPU performs predetermined functions (the components represented above as units, means, or the like).

The present invention is not limited to the above embodiment, but modifications may be made within the scope of the present invention. Furthermore, the processes described in the embodiment may be executed not only in a chronological sequence in accordance with the order of their description but also in parallel or separately depending on the processing capability of the processing device or as necessary.

As described, when the computer performs the processing functions of the hardware entity described in the embodiment (the device according to the present invention), the actions of processing for performing the processing functions to be provided to the hardware entity are described in programs. Thus, the computer executing the programs enables the functions of the hardware entity to be performed on the computer.

The program in which the actions of processing are described can be stored in a computer-readable storage medium. The computer-readable storage medium may be any kind of that, including a magnetic storage device, an optical disk, a magneto-optical storage medium, and a semiconductor memory. Specifically, the magnetic storage device may be a hard disk drive, a flexible disk, or a magnetic tape, the optical disk may be a digital versatile disc (DVD), a DVD-random access memory (DVD-RAM), a compact disc read only memory (CD-ROM), a CD-recordable (CD-R), or a CD-rewritable (CD-RW), the magneto-optical storage medium may be a magneto-optical disc (MO), the semiconductor memory may be an electronically erasable and programmable-read only memory (EEPROM).

The program is distributed by, for example, selling, transferring, or lending a portable storage medium such as a DVD or a CD-ROM in which the program is stored. Furthermore, the program may be distributed by transferring the program stored in the storage device of the server computer from the server computer to another computer via a network.

A computer that executes the program first stores temporarily, for example, the program stored in the portable storage medium or the program transferred from a server computer into a storage device thereof. When performing the actions, the computer reads the program stored in the storage device thereof and performs the actions according to the read program. As another form of execution of the program, the computer may read the program directly from the portable storage medium and perform the actions according to the program. Further, every time the program is transferred from the server computer to the computer, the computer may sequentially perform the actions according to the received program. Alternatively, without transferring the program from the server computer to the computer, the actions may be performed by a so-called application service provider (ASP) service that performs processing functions only by a command to execute the program and acquisition of results. Note that the program according to the present embodiment includes information that is provided for processing of an electronic computer and acts like a program (e.g., data that is not a direct command to a computer but has the properties defining processing of the computer).

Furthermore, the hardware entity involves execution of a predetermined program on a computer in the present embodiment but at least some of these actions of the processing may be implemented with hardware.

The invention claimed is:

1. A video and audio presentation device, the device comprising:
   an offset determination unit configured to determine a time-series offset $t_{offset}$ obtained by correcting a time difference $t_{diff}$ on a basis of a correction coefficient α determined according to a scale ratio of a real environment to a semi-virtual reality environment, or a scale ratio of a virtual reality environment to the semi-virtual reality environment, the time difference $t_{diff}$ representing a time difference between the physical reaction $A_{real}$ and the physical reaction $A_{mix}$, or a time difference between the physical reaction $A_{VR}$ and the physical reaction $A_{mix}$, where a physical reaction $A_{real}$ represents time-series data of subject's physical reaction to an incoming object in the real environment, a physical reaction $A_{VR}$ represents time-series data of subject's physical reaction to an incoming object presented in the virtual reality environment that includes no real environment (hereinafter simply referred to as virtual reality environment), and a physical reaction $A_{mix}$ represents time-series data of subject's physical reaction to an incoming object presented in the semi-virtual reality environment created by combining the virtual reality environment and the real environment (hereinafter simply referred to as semi-virtual reality environment);
   a video presentation unit configured to present video in the semi-virtual reality environment; and
   an audio presentation unit configured to shift audio corresponding to the video on a basis of the time series offset $t_{offset}$ so that the audio precedes arrival of the video, and to present the shifted audio in the semi-virtual reality environment.

2. The video and audio presentation device according to claim 1, wherein the correction coefficient α is defined as (r'/r)*(d'/d), where reference character r represents a size of the incoming object in the real environment or the virtual reality environment, reference character r' represents a size of the incoming object in the semi-virtual reality environment, reference character d represents a distance between the incoming object before release and the subject in the real environment, and reference character d' represents a distance between the incoming object before release and the subject in the semi-virtual reality environment.

3. The video and audio presentation device according to claim 1, wherein the correction coefficient α is defined as (r'/r), where reference character r represents a size of the incoming object in the real environment or the virtual reality environment, and reference character r' represents a size of the incoming object in the semi-virtual reality environment.

4. The video and audio presentation device according to claim 1, wherein the correction coefficient α is defined as (d'/d), where reference character d represents a distance between the incoming object before release and the subject in the real environment or the virtual reality environment, and reference character d' represents a distance between the incoming object before release and the subject in the semi-virtual reality environment.

5. A method of presenting video and audio, comprising the steps of:

determining a time-series offset $t_{offset}$ obtained by correcting a time difference $t_{diff}$ on a basis of a correction coefficient α determined according to a scale ratio of a real environment to a semi-virtual reality environment, or a scale ratio of a virtual reality environment to the semi-virtual reality environment, the time difference $t_{diff}$ representing a time difference between the physical reaction $A_{real}$ and the physical reaction $A_{mix}$, or a time difference between the physical reaction $A_{VR}$ and the physical reaction $A_{mix}$, where a physical reaction $A_{real}$ represents time-series data of subject's physical reaction to an incoming object in the real environment, a physical reaction $A_{VR}$ represents time-series data of subject's physical reaction to an incoming object presented in the virtual reality environment that includes no real environment (hereinafter simply referred to as virtual reality environment), and a physical reaction $A_{mix}$ represents time-series data of subject's physical reaction to an incoming object presented in the semi-virtual reality environment created by combining the virtual reality environment and the real environment (hereinafter simply referred to as semi-virtual reality environment);

presenting a video in the semi-virtual reality environment; and shifting audio corresponding to the video on a basis of the time-series offset $t_{offset}$ so that the audio precedes arrival of the video and presenting the shifted audio in the semi-virtual reality environment.

6. A non-transitory computer-readable storage medium storing a program that causes a computer to function as the video and audio presentation device according to claim 1.

* * * * *